(12) United States Patent
Kimura

(10) Patent No.: US 12,008,272 B2
(45) Date of Patent: Jun. 11, 2024

(54) PRINTING APPARATUS THAT RECEIVES SELECTION RESULT OF USE ENVIRONMENT OF THE PRINTING APPARATUS AND FURTHER CONFIGURES SETTINGS IN ASSOCIATION WITH SELECTED USE ENVIRONMENT, CONTROL METHOD, AND NON-TRANSITORY STORAGE MEDIUM

(71) Applicant: CANON KABUSHIKI KAISHA, Tokyo (JP)

(72) Inventor: Tomohiro Kimura, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/062,237

(22) Filed: Dec. 6, 2022

(65) Prior Publication Data

US 2023/0176793 A1 Jun. 8, 2023

(30) Foreign Application Priority Data

Dec. 8, 2021 (JP) .................................. 2021-199141
May 18, 2022 (JP) .................................. 2022-081499

(51) Int. Cl.
*G06F 3/12* (2006.01)
*H04N 1/00* (2006.01)

(52) U.S. Cl.
CPC .......... *G06F 3/1204* (2013.01); *G06F 3/1238* (2013.01); *G06F 3/128* (2013.01); *H04N 1/00896* (2013.01)

(58) Field of Classification Search
None
See application file for complete search history.

(56) References Cited

U.S. PATENT DOCUMENTS 8,085,414 B2 * 12/2011 Ishikawa ............... G06F 3/1273
358/1.15
2005/0002058 A1 * 1/2005 Hirabayashi ....... H04N 1/00137
358/1.15

(Continued)

FOREIGN PATENT DOCUMENTS

JP 2007185814 A 7/2007
JP 2009104592 A 5/2009

(Continued)

*Primary Examiner* — Haris Sabah
(74) *Attorney, Agent, or Firm* — Canon U.S.A., Inc. IP Division

(57) ABSTRACT

A printing apparatus stores a setting value group including a plurality of setting values corresponding to a plurality of setting items including a security setting item specific to the printing apparatus in association with a first use environment and a setting value group including a plurality of setting values corresponding to a plurality of setting items not including the security setting item specific to the printing apparatus in association with a second use environment. The printing apparatus accepts information indicating a selection result specifying a use environment of the printing apparatus. A setting value of the printing apparatus is changed based on the setting value group corresponding to the first use environment or the second use environment specified by the information indicating the selection result.

21 Claims, 10 Drawing Sheets

(56) References Cited

U.S. PATENT DOCUMENTS

| | | | |
|---|---|---|---|
| 2007/0133033 A1* | 6/2007 | Mizutani | G06F 3/1213 |
| | | | 358/1.14 |
| 2014/0033090 A1* | 1/2014 | Yamada | G06F 3/1258 |
| | | | 715/764 |
| 2014/0310767 A1 | 10/2014 | Nishimura | |
| 2017/0223230 A1* | 8/2017 | Bunker | H04N 1/4426 |
| 2018/0275939 A1* | 9/2018 | Kanai | G06F 3/1222 |
| 2019/0114128 A1* | 4/2019 | Nagahara | G06F 3/1204 |
| 2021/0081152 A1 | 3/2021 | Tanaka | |

FOREIGN PATENT DOCUMENTS

| | | |
|---|---|---|
| JP | 2011147128 A | 7/2011 |
| JP | 2018144453 A | 9/2018 |
| JP | 2021016136 A | 2/2021 |

* cited by examiner

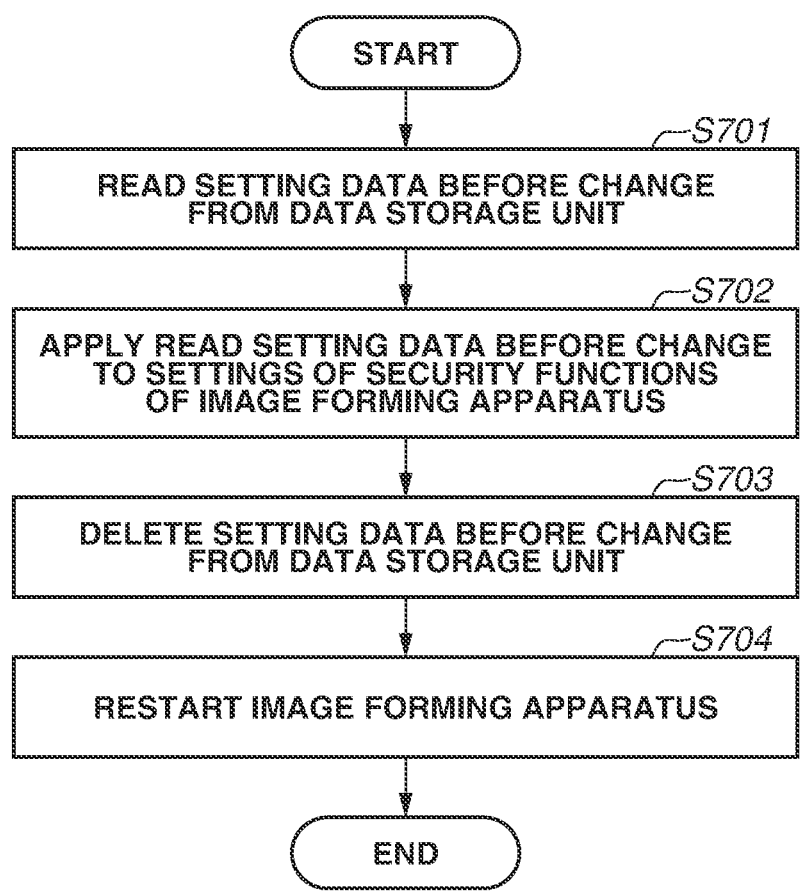

FIG.8A

SETTING/REGISTRATION
< RECOMMENDED SECURITY SETTING >  ~800

DO YOU USE THIS DEVICE IN INTERNET-CONNECTED ENVIRONMENT?

[ YES ]   [ NO ]

FIG.8B

SETTING/REGISTRATION
< RECOMMENDED SECURITY SETTING >  ~801

IS NETWORK FIREWALLED?

[ YES ]   [ NO ]

FIG.8C

SETTING/REGISTRATION
< RECOMMENDED SECURITY SETTING >  ~802

USE ENVIRONMENT IS INTERNET DIRECT CONNECTION TYPE. DO YOU CONFIGURE USE ENVIRONMENT?

[ CANCEL ]   [ YES ]

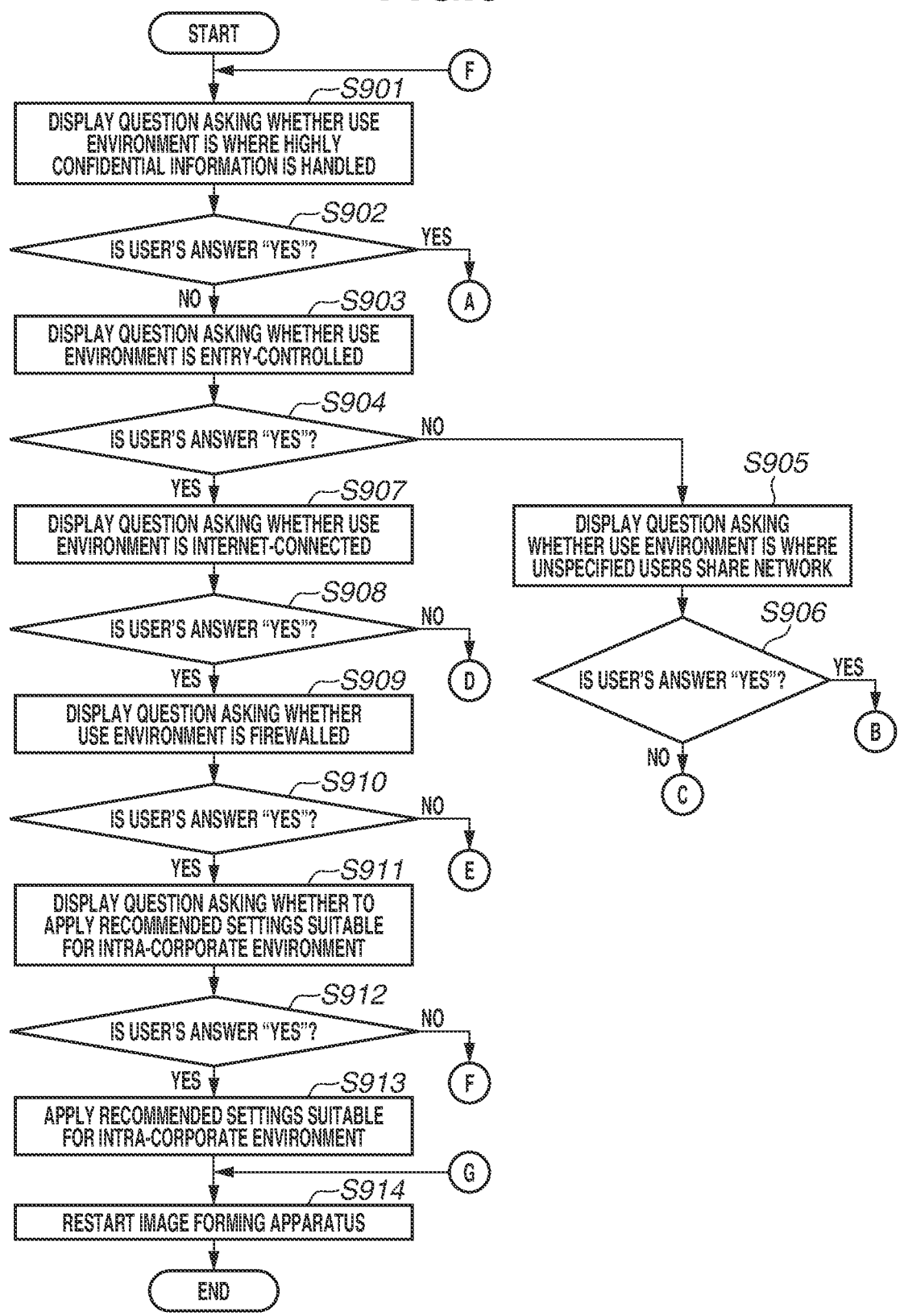

PRINTING APPARATUS THAT RECEIVES SELECTION RESULT OF USE ENVIRONMENT OF THE PRINTING APPARATUS AND FURTHER CONFIGURES SETTINGS IN ASSOCIATION WITH SELECTED USE ENVIRONMENT, CONTROL METHOD, AND NON-TRANSITORY STORAGE MEDIUM

BACKGROUND OF THE INVENTION

Field of the Invention

The present invention relates to a printing apparatus that collectively configures settings of security-related functions.

Description of the Related Art

Network-connected information processing apparatuses typically have a setting function of configuring settings of security-related functions (hereinafter, may be referred to as security functions) based on user operations. Information processing apparatuses have recently been installed in various environments (network environments), including a work-from-home environment and a public space shared by many and unspecified persons, and desired security settings have been getting complicated.

Japanese Patent Application Laid-Open No. 2007-185814 discusses a technique for having a user specify one of graded security levels and collectively configuring the settings of security-related functions of an image forming apparatus based on the security level.

However, Japanese Patent Application Laid-Open No. 2007-185814 does not take into account configuring the settings of the security-related functions to ones suitable for the use environment of the image forming apparatus. The user can therefore be unaware of which security level to specify for the use environment of the image forming apparatus.

SUMMARY OF THE INVENTION

The present invention is directed to providing an information processing apparatus that accepts a user operation for selecting a use environment of a printing apparatus and configures the settings of security-related functions to settings suitable for the selected use environment. The present invention is also directed to improving the convenience of the settings of the security-related functions.

According to an aspect of the present invention, a printing apparatus includes a storage unit configured to store a setting value group including a plurality of setting values corresponding to a plurality of setting items including a security setting item specific to the printing apparatus in association with a first use environment and a setting value group including a plurality of setting values corresponding to a plurality of setting items not including the security setting item specific to the printing apparatus in association with a second use environment, an acceptance unit configured to accept information indicating a selection result specifying a use environment of the printing apparatus, and a setting change unit configured to change a setting value of the printing apparatus based on the setting value group corresponding to the first use environment or the second use environment specified by the information indicating the selection result, the setting value group being stored in the storage unit.

Further features of the present invention will become apparent from the following description of embodiments with reference to the attached drawings.

BRIEF DESCRIPTION OF THE DRAWINGS

FIG. 7 is a flowchart illustrating an example of security setting cancellation processing performed by the image forming apparatus.

FIGS. 8A to 8C are diagrams illustrating examples of screen displayed on an operation unit of an image forming apparatus in a second embodiment.

FIG. 9 is a flowchart illustrating an example of screen display and security setting processing performed by the image forming apparatus in the second embodiment.

DESCRIPTION OF THE EMBODIMENTS

Embodiments of the present invention will be described below with reference to the drawings. The following embodiments are not intended to limit the invention set forth in the claims, and all combinations of features described in the embodiments are not necessarily indispensable to the solving means of the invention. Each of the embodiments of the present invention described below can be implemented solely or as a combination of a plurality of the embodiments or features thereof where necessary or where the combination of elements or features from individual embodiments in a single embodiment is beneficial.

Figure 1:
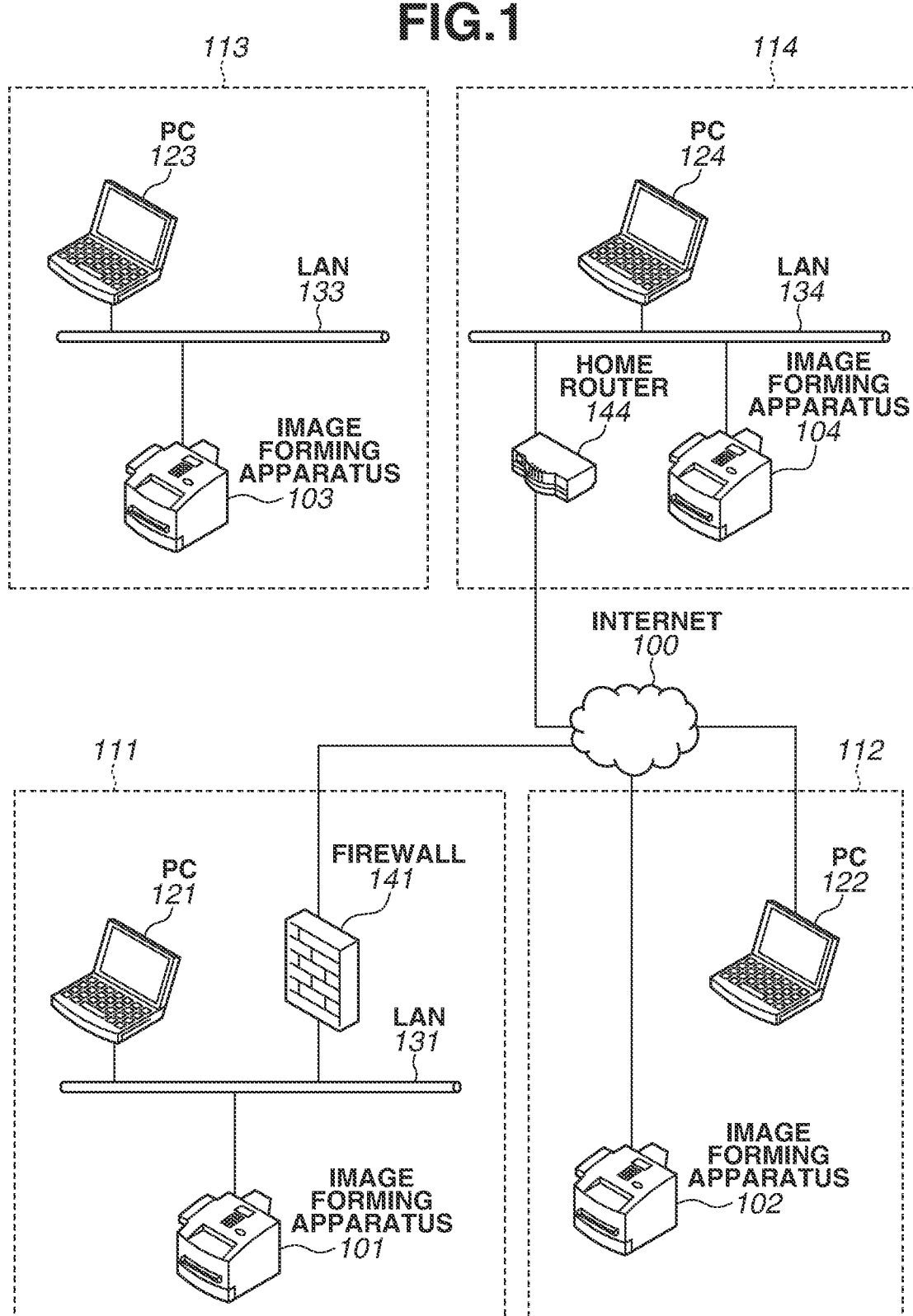
FIG. 1 is a diagram illustrating examples of use environments of information processing apparatuses.

FIG. 1 is a configuration diagram illustrating examples of use environments of information processing apparatuses according to a first embodiment.

Image forming apparatuses 101 to 104 that are examples of the information processing apparatuses according to the present embodiment are installed in respective difference use environments 111 to 114. Specifically, the use environments 111 to 114 illustrated in FIG. 1 are a corporate intranet environment 111, an Internet direct connection environment 112, an Internet disabled environment 113, and a home environment 114.

The corporate intranet environment 111 is an environment where the image forming apparatus 101 and a personal computer (PC) 121 are connected via a corporate local area network (LAN) 131. A firewall 141 is installed between the LAN 131 and the Internet 100.

In other words, communications between each information processing apparatus in the corporate intranet environment 111 and the Internet 100 are monitored and protected by the firewall 141. In the corporate intranet environment 111, the threat of attackers' access to the information processing apparatuses over the Internet 100 is greatly reduced.

By contrast, the Internet direct connection environment 112 is not firewalled. The Internet direct connection environment 112 is an environment where the image forming apparatus 102 and a PC 122 are directly connected to and communicate over the Internet 100. Information processing apparatuses, such as the image forming apparatus 102 and the PC 122, therefore desirably implement measures against the threat of attackers' access over the Internet 100 by using a personal firewall function in each information processing apparatus.

The Internet disabled environment 113 is a closed network environment isolated from other networks, such as the Internet 100. Information processing apparatuses, such as the image forming apparatus 103 and a PC 123, are connected via a LAN 133. In the Internet disabled environment 113, network communication can only be performed between the information processing apparatuses on the LAN 133. The information processing apparatuses are not accessed by unspecified users on the Internet 100.

The home environment 114 is an environment where the image forming apparatus 104 and a PC 124 are connected via a home LAN 134. The LAN 134 is a private network configured by a home router 144. Unlike the corporate intranet environment 111, there is no security measures with a secure firewall. As in the Internet direct connection environment 112, the information processing apparatuses installed in the home environment 114 therefore desirably implement measures against the threat of attackers' access over the Internet 100 by using a personal firewall function in each information processing apparatus.

In the present embodiment, a not-illustrated public space environment and high security control environment are assumed in addition to the use environments 111 to 114. The classification of these six use environments will be described in detail with reference to FIG. 2.

Figure 2:
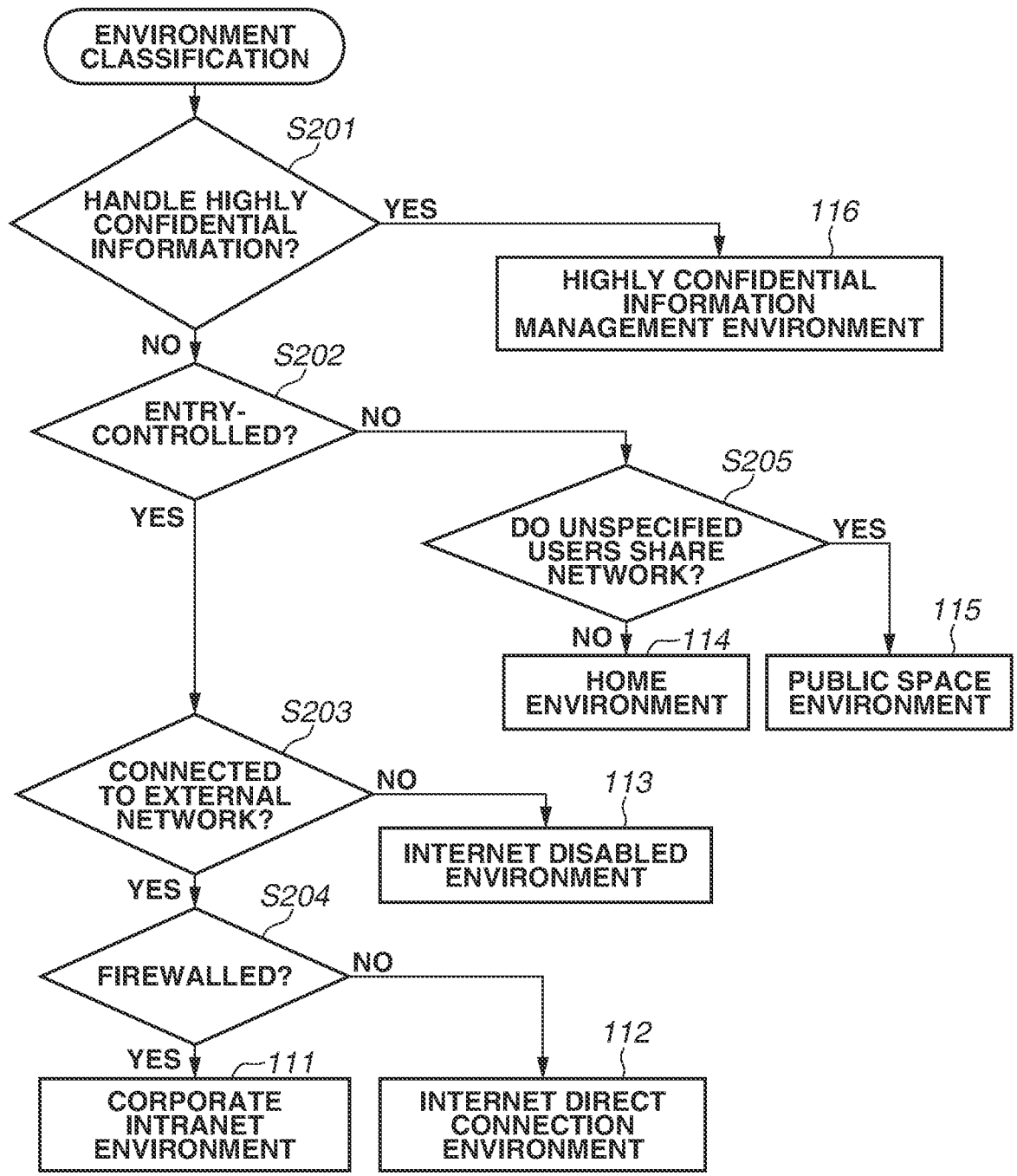
FIG. 2 is a flowchart illustrating examples of conditions for classifying the use environments of the information processing apparatuses.

In the present embodiment, the use environments of information processing apparatuses are classified into six categories, and appropriate security settings are provided for each category. FIG. 2 is a flowchart illustrating the concept of classification in classifying and defining the use environments. The following definitions of use environments are not intended to limit the present invention, and some of the use environments described in the present embodiment or other use environments may be defined. For example, in a corporate setting, use environments may be classified by type of business, like financial institutions and government offices.

In step S201, environments are classified based on whether highly confidential information is handled. An environment where highly confidential information is handled can be said to be an environment where security measures are desirably given the top priority. In the embodiment, such an environment where security measures are desirably given the top priority will be defined as a highly confidential information management environment 116.

Use environments where highly confidential information is not handled are further subdivided in classification. In step S202, the use environments are classified based on whether the environments are entry-controlled. This is an example of classification based on whether unspecified users can physically access the information processing apparatuses, i.e., whether users to enter the location where the information processing apparatuses are installed are restricted. The classification condition as to whether the information processing apparatuses are physically accessible is therefore not limited to that of the present embodiment, and conditions other than the entry control may be used as the classification condition. The entry control in the present embodiment is not limited to that of a card-based access system, either. For example, entry-controlled environments may include an environment where only persons who belong to the organization work during business hours and persons who can enter the room are thus substantially limited, and the room is locked after business hours.

Use environments that are not entry-controlled, i.e., where unspecified users can physically access the information processing apparatuses are subdivided based on the classification condition of step S205. In step S205, the use environments are classified based on whether unspecified users share the network. In the present embodiment, an environment where unspecified users share the network will be defined as a public space environment 115. An environment where unspecified users do not share the network will be defined as the home environment 114. In the present embodiment, an environment where unspecified users do not share the network, i.e., where users can be identified like the home environment 114 will be defined as a private network environment.

Use environments classified to be entry-controlled in step S202 are further subdivided based on the classification condition of step S203. In step S203, the use environments are classified based on whether the information processing apparatuses are connected to an external network, such as the Internet 100. An environment with no connection to an external network, such as the Internet 100, will be defined as the Internet disabled environment 113. The Internet disabled environment 113 that is entry-controlled and based on a closed network is a private network environment.

Use environments where the information processing apparatuses are connected to an external network, such as the Internet 100, are subdivided based on the classification condition of step S204. In step S204, the use environments are classified based on whether the environments are firewalled. A firewalled environment will be defined as the corporate intranet environment 111. An unfirewalled environment will be defined as the Internet direct connection environment 112. The corporate intranet environment 111 where the users who use the network can be limited by the firewall is a private network environment.

Next, the foregoing six use environments and security measures to be taken in each use environment will be described with reference to Table 1. Seven examples of the security measures will be described here.

TABLE 1

| | Corporate intranet environment | Internet direct connection environment | Internet disabled environment | Home environment | Public space environment | Highly confidential information |
|---|---|---|---|---|---|---|
| Encryption of communication paths | Yes | Yes | Optional | Yes | Yes | Yes |
| Disabling legacy protocols | Yes | Yes | Optional | Yes | Yes | Yes |
| Enabling personal firewall | Optional | Yes | Optional | Yes | Yes | Yes |

TABLE 1-continued

|  | Corporate intranet environment | Internet direct connection environment | Internet disabled environment | Home environment | Public space environment | Highly confidential information |
|---|---|---|---|---|---|---|
| Authentication safety enhancement | Yes | Yes | Optional | Yes | Yes | Yes |
| Measures against physical attacks | Optional | Optional | Optical | Yes | Yes | Yes |
| Disabling file sharing function | Optional | Yes | Optional | Optional | Yes | Yes |
| Disabling external storage devices | Yes | Yes | Yes | Yes | Yes | Yes |

(*Yes: Recommended)

To encrypt communication paths is a security measure to prevent information leakage by encrypting communications on the network. An example of the function for encrypting communication paths is Transport Layer Security (TLS). In an Internet-connected environment, the communication paths are desirably encrypted since communications can be wiretapped by a third party. More specifically, the communication paths are recommended to be encrypted except in the Internet disabled environment 113.

To disable legacy protocols is a security measure to prevent spoofing and information leakage by disabling functions using unsecure legacy communication protocols. An example of a legacy protocol is Windows® Internet Name Service (WINS). Like the encryption of the communication paths, the legacy protocols are desirably disabled in environments connected to an external network, such as the Internet 100. Specifically, the legacy protocols are recommended to be disabled except in the Internet disabled environment 113.

A personal firewall refers to a firewall installed and used on an information processing apparatus. Like regular firewalls, the personal firewall monitors communications between the information processing apparatus and an external network, such as the Internet 100. Examples of firewalls include an Internet Protocol (IP) filter and a port number filter. The IP filter is a security measure to read transmission destination information and source information about communication packets and permit only communication packets set in advance. This can prevent unauthorized access and avoid information leakage. The port number filter is a security measure to prevent port intrusion by closing unused ports. This can prevent a denial-of-service (DoS) attack, a cyberattack that exploits vulnerabilities by overloading. In an environment that is connected to an external network and not firewalled, personal firewalls are desirably enabled in view of possible information leakage or DoS attacks. Specifically, personal firewalls are recommended to be enabled except in the Internet disabled environment 113 not connected to an external network or the corporate intranet environment 111 that is firewalled.

The authentication safety enhancement refers to enhancing measures against spoofing by disabling password caching or specifying the minimum number of password characters, for example. Authentication safety-enhancing measures are desirably taken against possible spoofing except in the Internet disabled environment 113 where the information processing apparatuses are connected within the isolated network.

The measures against physical attacks are security measures to prevent physical information leakage. The image forming apparatuses 101 to 104 generate temporary data, such as a print job, in their hard disk. The image forming apparatuses 101 to 104 have a full erase function of automatically completely erasing the generated temporary data simultaneously with the end of the job. The full erase function is one of examples of the measures for the image forming apparatuses 101 to 104 to take against physical attacks. Enabling the full erase function prevents the temporary data from being read even if the hard disk is physically taken out. The measures against physical attacks are desirable in the home environment 114 and the public space environment 115 that are not entry-controlled and where physical access to the image forming apparatuses are unable to be restricted. The measures against physical attacks are also desirable in the highly confidential information management environment 116 where a reduction in the risk of information leakage is given the top priority.

A file sharing function is a function of sharing files on the network in an environment. To prevent information leakage, the file sharing function is desirably disabled in environments where unspecified users share the network. Specifically, the file sharing function is recommended to be disabled except in private network environments where specific users share the network. As described above, the private network environments according to the present embodiment are the corporate intranet environment 111, the Internet disabled environment 113, and the home environment 114. The file sharing function is thus recommended to be disabled in the other environments, i.e., the Internet direct connection environment 112, the public space environment 115, and the highly confidential information management environment 116. An example of the setting about the file sharing function is a Server Message Block (SMB) server setting.

Disabling an external storage device refers to, for example, disabling the use of a Universal Serial Bus (USB) storage device as an external storage device on the information processing apparatuses. This can prevent information from being written to an external storage device and can prevent information leakage. Infection with computer viruses via a USB storage device and resulting information leakage can also be avoided. The threat of information leakage via USB and other external storage devices is common to all the use environments. External storage devices are therefore desirably disabled in all the use environments.

Table 2 lists conceivable setting items and setting values recommended for the respective use environments based on the foregoing security measures. Items recommended to be set are listed with recommended setting values such as "on", "off", and "rejected". If a user selects a use environment on a screen illustrated in FIG. 5 to be described below, recommended setting values for the selected use environment are applied by processing illustrated in FIG. 6 to be described below.

The image forming apparatuses 101 to 104 that are examples of the image forming apparatuses have a wide variety of setting items, including security function-related setting items and other setting items, and perform various types of control based on the setting values corresponding to the setting items. Table 2 lists 22 items intended for collective setting of security functions according to the present embodiment.

dedicated port" is "off", printer information becomes unavailable in using a printer driver over a network connection. This item is thus recommended to be "off" in the

TABLE 2

| | Corporate intranet environment | Internet direct connection environment | Internet disabled environment | Home environment | Public space environment | Highly confidential information management environment |
|---|---|---|---|---|---|---|
| TLS setting | On | On | | On | On | On |
| WINS setting | Off | Off | | Off | Off | Off |
| Default policy for IP address filter | | Rejected | | Rejected | Rejected | Rejected |
| Exception addresses for IP address filter | | Subnet address for image forming apparatuses | | Subnet address for image forming apparatuses | Subnet address for image forming apparatuses | Subnet address for image forming apparatuses |
| Caching of authentication password on external server | disabled | disabled | | disabled | disabled | disabled |
| Minimum number of password characters | 8 | 8 | | 8 | 8 | 8 |
| Hard disk full erase | | | | On | On | On |
| SMB server setting | | Off | | | Off | Off |
| Use USB external storage device | Off | Off | Off | Off | Off | Off |
| Use LPD printing | | Off | | Off | Off | Off |
| Use raw printing | | Off | | Off | Off | Off |
| Use WSD printing | | Off | | Off | Off | Off |
| Use IPP printing | | | | | | On |
| Use SNMPv1 | | Off | | Off | Off | Off |
| Use dedicated port | | Off | | | Off | Off |
| Automatic deletion of interrupted job | | | | On | On | On |
| Transmission result report | | | | Off | Off | Off |
| Always use PIN for simple login | | | | On | On | On |
| Display job status before authentication | | | | Off | Off | Off |
| Display job history | | | | Off | Off | Off |
| Obtain audit log | On | On | On | On | On | On |
| Store key operation log | On | On | On | On | On | On |

The Line Printer Daemon (LPD), RAW, Web Services on Devices (WSD), and the Internet Printing Protocol (IPP) are printing protocols for performing communication between a client device and a printer. Unlike the other protocols, the IPP provides user authentication, access control, and communication data encryption functions by itself, and is thus a secure print protocol compared to the other protocols. In the highly confidential information management environment 116 where high security is desired, "use IPP printing" is therefore recommended to be "on". The LPD, RAW, and WSD protocols less secure than the IPP are recommended to be "off" except in the corporate intranet environment 111 that is a reliable environment, or the Internet disabled environment 113.

Simple Network Management Protocol (SNMP) is a protocol for monitoring and controlling communication devices on a network, and can check the number of sheets printed by a printer and error information using a PC. SNMPv1 determines the communication range using information called community name. There is a risk of information leakage since the community name is communicated over a network without encryption. This item is thus recommended to be "off" except in the corporate intranet environment 111 that is a reliable environment, or the Internet disabled environment 113 with no Internet connection.

A dedicated port refers to a port used by a printer driver to set and refer to printer information. If the item "use Internet direct connection environment 112 and the public space environment 115, since there is a risk of information leakage. This item is also recommended to be "off" in the highly confidential information management environment 116 where high security is desired.

The automatic deletion of an interrupted job refers to a function of automatically deleting a print job interrupted due to an error. This can prevent a situation where the interrupted print job is resumed after a time and the printed product is left unattended, and can reduce the risk of information leakage. This setting is recommended to be "on" in the home environment 114 and the public space environment 115 that are not entry-controlled, and in the highly confidential information management environment 116 where high security is desired.

A transmission result report is a report for checking whether transmission to intended destinations is properly completed. This item sets whether to automatically print a report of transmission results about facsimile, email, and Internet facsimile (I-fax) transmission, and about storage into a file server or a user box. Turning the transmission result report "off" can prevent a report containing information about the transmitted contents and the transmission history is left unattended on the printer, and can reduce the risk of information leakage. This item is recommended to be "off" in the home environment 114 and the public space environment 115 that are not entry-controlled, and in the highly confidential information management environment 116 where high security is desired.

A simple login refers to a method for logging in by pressing a username displayed on an operation panel. Such a method can save the time and labor to enter a username. A personal identification number (PIN) can be set for a simple login. This item can set whether to always use a PIN. If a PIN is not used, the user can easily log in by simply selecting a username displayed on the operation panel, whereas there is a risk of spoofing. Turning this item "on" can reduce the risk of spoofing. This setting is recommended to be "on" in the home environment 114 and the public space environment 115 that are not entry-controlled, and in the highly confidential information management environment 116 where high security is desired.

The item "display job status before authentication" can set whether to display a screen where a job status can be checked before authentication in using a login service. Turning this item "off" can prevent the job status from being seen by many and unspecified persons, and can reduce the risk of information leakage. This setting is recommended to be "off" in the home environment 114 and the public space environment 115 that are not entry-controlled, and in the highly confidential information management environment 116 where high security is desired.

A job history refers to a history of print jobs, and contains information about the usernames of users having instructed printing and the document names of documents printed. Turning off the display of the job history can prevent information, such as the document names and the usernames of the users having printed the documents, from been seen by many and unspecified persons, and can reduce the risk of information leakage. This setting is recommended to be "off" in the home environment 114 and the public space environment 115 that are not entry-controlled, and in the highly confidential information management environment 116 where high security is desired.

An audit log function can be used to audit security events. For example, a user authentication log can be used to audit whether unauthorized device access has been made or attempted. A log during device usage, such as printing, document transmission, and setting change, can be used to audit unauthorized device use. A key operation log is a log of key operations made by users. Examples include a key operation log during login operations. How a printer has been operated can be investigated by storing and analyzing such logs. The acquisition or storage of audit logs or key operation logs can preclude a user who has made an unauthorized access or unauthorized use from denying it. Since there is always a risk of denial in any of the environments, this setting is recommended in all the six environments 111 to 116.

Although not listed in Table 2, other setting items can be added for the highly confidential information management environment 116 where high security is desired. Examples include "use Mopria", "use AirPrint", and "use remote user interface (UI)".

For the home environment 114, other setting items can also be added. Examples include items related to Printer Job Language (PJL) and Embedded Web Server (EWS) administrator passwords, and SNMPv1/v2 and SNMPv3. For example, a change of PJL and EWS administrator passwords from devices to which the collective setting of the home environment 114 is applied can be controlled. SNMP is a device management protocol for an administrator to obtain and configure the setting values of image forming apparatuses, such as a printing apparatus, via a network. Since SNMP access enables changing the setting values of the functions of an image forming apparatus freely, the rights to configure the settings can also be managed. A change of the settings about the rights related to the device management protocols can be controlled in the home environment 114 so that general users working from home do not change settings after a setting value group compliant with the company's policy is reflected. Moreover, setting items related to a firmware version check or update can be added. A setting item for selecting whether to limit access to PJL commands and a setting item related to Hypertext Transfer Protocol Secure (HTTPS) redirection can also be added.

The setting values are not limited to those of Table 2, as long as the setting values are suitable for the respective use environments. For example, in Table 2, the personal firewall settings are not needed for the corporate intranet environment 111 since the corporate intranet environment 111 is firewalled. However, the firewall installed in the office and a personal firewall can be used in combination. Under such circumstances, collective setting including the personal firewall settings can be performed even in the corporate intranet environment 111 and the Internet disabled environment 113. The same applies to other setting items.

Of the setting items listed in Table 2, the TLS setting and the personal firewall-related settings are setting items related to the networks in general. By contrast, the items related to printing protocols and the items related to the functions and device management of a printing apparatus, such as the display of a print job history, are setting items specific to the printing apparatus.

In the present embodiment, information processing apparatuses that make settings suitable for a selected use environment, based on the foregoing definitions of the environment classifications and the recommended setting values of the security functions are provided. Hereinafter, a specific description will be given.

<Hardware Configuration of Image Forming Apparatus>

Figure 3:
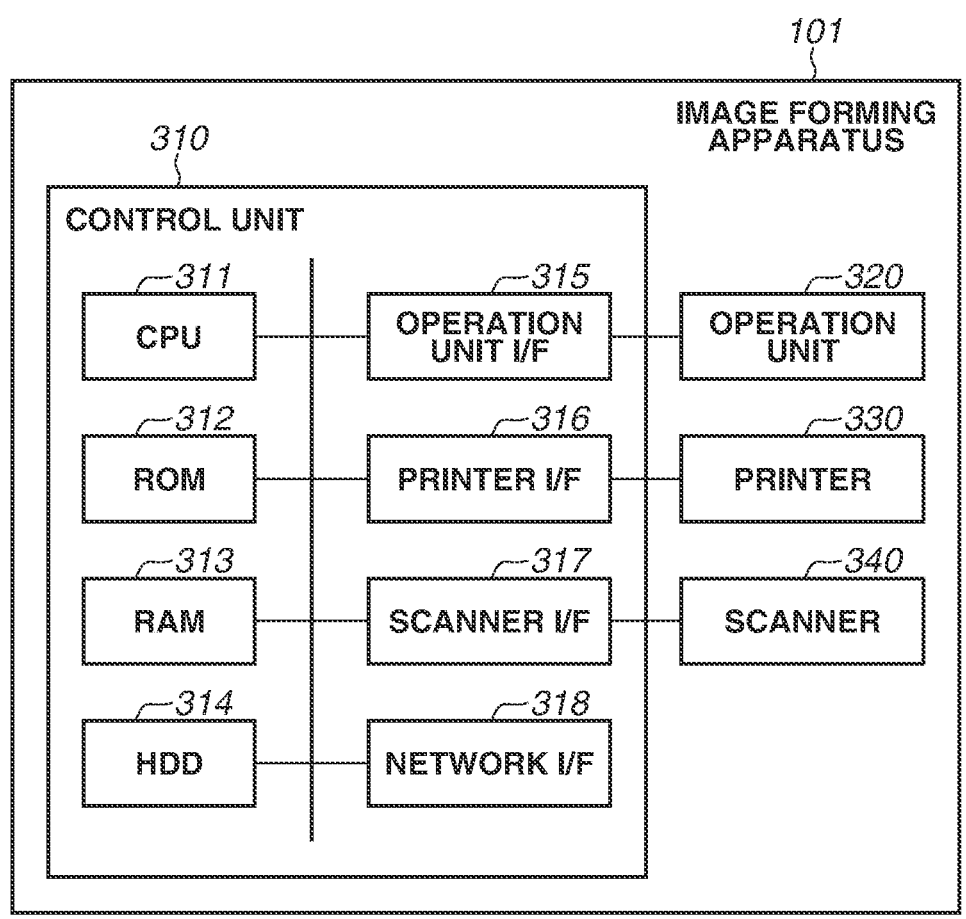
FIG. 3 is a block diagram illustrating an example of a hardware configuration of an image forming apparatus.

A hardware configuration of the image forming apparatus 101 that is an example of an information processing apparatus according to the present embodiment will be described with reference to FIG. 3. While FIG. 3 deals only with the image forming apparatus 101, the image forming apparatuses 102 to 104 and the image forming apparatuses installed in the not-illustrated public space environment 115 and highly confidential information management environment 116 have a similar configuration to that of the image forming apparatus 101.

The image forming apparatus 101 includes a printer 330 for outputting electronic data onto a paper medium, and a scanner 340 for reading a paper medium and converting the result into electronic data. In the present embodiment, the image forming apparatus 101 having a plurality of functions is described as an example of the information processing apparatus. However, this is not restrictive. For example, the image forming apparatus 101 may be an apparatus, such as a single-function printer and a single-function scanner. The image forming apparatus 101 may also be an apparatus, such as a three-dimensional (3D) printer and a 3D scanner.

A control unit 310 including a central processing unit (CPU) 311 controls an operation of the entire image forming apparatus 101. A read-only memory (ROM) 312 is used to store programs to be executed by the CPU 311. The CPU 311 reads control programs stored in the ROM 312, and performs various types of control on the image forming apparatus 101, including read control and transmission control. A random access memory (RAM) 313 is used as a temporary storage area, such as a main memory and a work area of the CPU 311. A hard disk drive (HDD) 314 is a storage device storing image data, various programs, and various types of setting information. Other storage devices, such as a solid state drive (SSD), may also be included. These pieces of hardware, namely, the CPU 311, the ROM 312, the RAM 313, and the HDD 314 constitute a computer.

An operation unit interface (I/F) 315 connects an operation unit 320 and the control unit 310.

The operation unit 320 includes a liquid crystal display unit having a touchscreen function, and various hardware keys. The operation unit 320 functions as a display unit for displaying information to the user and an acceptance unit for accepting the user's instructions.

A printer I/F 316 connects the printer 330 and the control unit 310. Image data for the printer 330 to print is transferred from the control unit 310 via the printer I/F 316. The printer 330 outputs the input image data onto a recording medium. A scanner I/F 317 connects the scanner 340 and the control unit 310. The scanner 340 reads a document placed on a not-illustrated document table and generates image data. The generated image data is input to the control unit 310 via the scanner I/F 317.

A network I/F 318 to which a network cable is connected can communicate with external apparatuses on the LAN 131. In the present embodiment, the network I/F 318 is assumed to be a communication I/F for performing wired communication. However, this is not restrictive. For example, the network I/F 318 may be a wireless communication I/F. While the network I/F 318 of the image forming apparatus 101 is connected to the LAN 131, the network to be connected varies depending on the use environment.

For example, the image forming apparatus 102 is directly connected to the Internet 100. The image forming apparatuses 103 and 104 are connected to the LANs 133 and 134, respectively.

<Software Configuration of Image Forming Apparatus>

Figure 4:
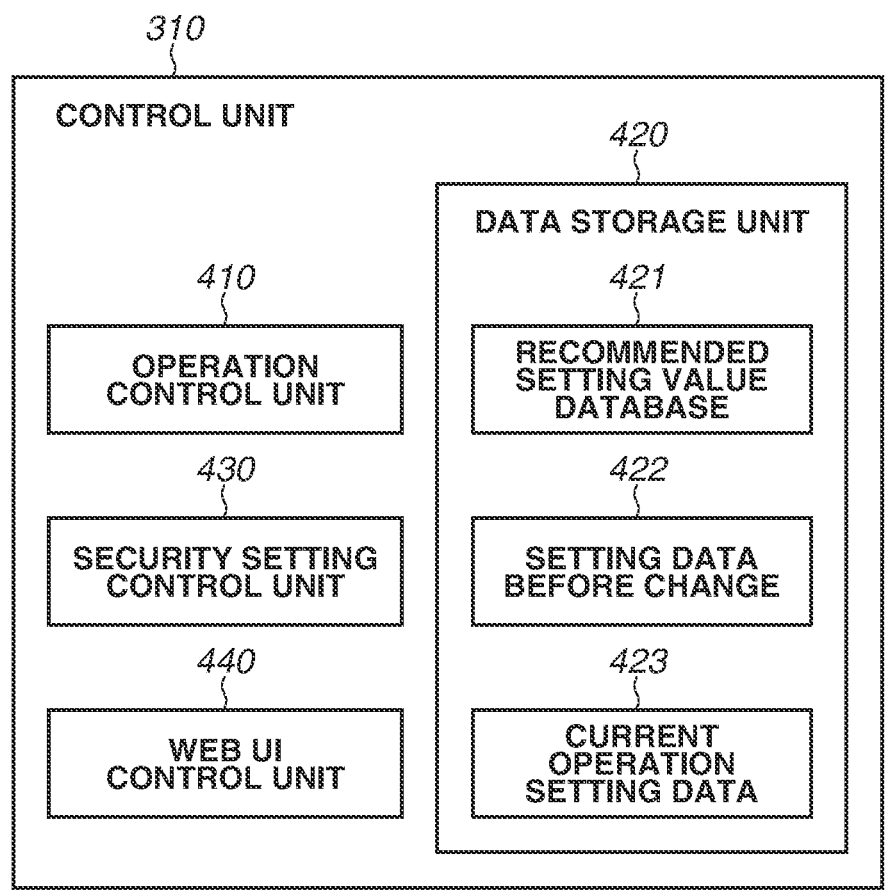
FIG. 4 is a block diagram illustrating an example of a software configuration of the image forming apparatus.

Next, a software configuration of the image forming apparatus 101 that is an example of an information processing apparatus according to the present embodiment will be described with reference to FIG. 4. The components illustrated in FIG. 4 are implemented by the CPU 311 executing programs corresponding to the respective components, stored in the ROM 312.

An operation control unit 410 displays a user screen on the operation unit 320. The operation control unit 410 detects user operations, and switches screens or updates display based on the detection result.

A data storage unit 420 stores data into the HDD 314 and reads data from the HDD 314 based on requests from other control units. The data storage unit 420 stores information about the settings of the security functions in addition to setting information for determining the operation of the image forming apparatus 101. Specifically, the data storage unit 420 stores a recommended setting value database 421, setting data before change 422, and current operation setting data 423.

The recommended setting value database 421 is a database containing data, such as listed in the foregoing Table 2. In other words, the recommended setting value database 421 is a database where combinations of setting items and setting values of the security functions suited for use environments of the image forming apparatus 101 are associated with the plurality of use environments classified. Here, the setting items refer to items, such as the TLS setting and the WINS setting. The setting values refer to ones represented as "on", "off", "rejected", and the like in Table 2. Setting items of which setting values are blank and represented by diagonal lines in Table 2 do not have recommended setting values.

In other words, the setting values of such setting items will not be changed, and the setting values before a setting change will be inherited.

In the present embodiment, the recommended setting value database 421 is defined by the vendor of the image forming apparatus 101 in advance and stored in the data storage unit 420.

The setting data before change 422 refers to data on the combinations of the setting items and the setting values that are applied before the user selects an environment type on a setting screen 500 of FIG. 5 to be described below. The setting data before change 422 is used to restore the setting values if a security setting control unit 430 to be described below performs collective setting and an issue of a function desired by the end user being unable to be used with the collectively configured operation settings occurs. In the present embodiment, the setting data before change 422 is stored when the user selects any environment type of the image forming apparatus 101 for the first time or when the user selects any environment type for the first time after a setting cancel button 502 to be described below is pressed. In other words, if the user continuously selects environment types, the setting data before change 422 is not updated.

The current operation setting data 423 refers to data on the combinations of the setting items and the setting values currently applied to the image forming apparatus 101. The current operation setting data 423 is rewritten when settings are changed. When the image forming apparatus 101 is restarted, the rewritten current operation setting data 423 is read by the programs and the image forming apparatus 101 runs with the applied settings.

The security setting control unit 430 collectively configures the settings of the security functions of the image forming apparatus 101 based on the user's instructions detected by the operation control unit 410. Specific setting control will be described below with reference to FIGS. 6 and 7. The collective setting according to the present embodiment is a function capable of collectively setting the recommended setting values of the typical security functions defined by the vendor. This function will hereinafter be referred to also as a collective setting function. The collective setting function is different in nature from a function of applying a user-edited security policy and disabling changes in the settings of specific security setting items to ones not compliant with the policy. More specifically, even if the collective setting is performed using the collective setting function, the user such as an administrator can still change the setting values of the respective setting items to different setting values again via not-illustrated individual setting change screens based on the actual use condition.

A web UI control unit 440 controls a setting screen displayed on an external information processing apparatus, such as the PC 121, via the network OF 318. The user can refer to and change the settings of the image forming apparatus 101 using the setting screen on a web browser provided by the web UI control unit 440. The web UI control unit 440 may have a function of importing and exporting the recommended setting value database 421. This function enables the user to generate and edit a data file related to the recommended setting value database 421 on the PC 121. The edited recommended setting value database 421 can be transmitted to the image forming apparatus 101 and stored in the data storage unit 420. In the present embodiment, the web UI control unit 440 can be omitted.

The setting screen 500 displayed on the operation unit 320 of the image forming apparatus 101 will be described with reference to FIG. 5. While the setting screen 500 displayed on the operation unit 320 of the image forming apparatus 101 is described in the present embodiment, this is not restrictive. For example, a web page similar to the setting screen 500 may be provided to a web browser on an external information processing apparatus using the web UI control unit 440, and setting operations may be made via the web page.

The setting screen 500 is a screen displayed on the operation unit 320 by the operation control unit 410. Use environment list buttons 501 are buttons for the user to select use environments. The user selects the use environment of the image forming apparatus 101 from the use environment list buttons 501 on the setting screen 500 and presses an execution button 503. In the present embodiment, the user selects one of the six use environment options illustrated in FIG. 2. The operation control unit 410 of the image forming apparatus 101 detects the user's operation and transmits information indicating the result of the selection made by the user to the security setting control unit 430. The security setting control unit 430 collectively configures the settings of the security functions suitable for the user-selected use environment received from the operation control unit 410.

The setting cancel button 502 is a button for the user to cancel the collective setting of the security functions after the collective setting is made. The user presses the execution button 503 with the setting cancel button 502 selected. The operation control unit 410 detects the user's operation and transmits information indicating the user's setting cancellation instruction to the security setting control unit 430.

Receiving the information indicating the setting cancellation instruction, the security setting control unit 430 cancels the collective setting of the security functions and restores the original settings. An issue with the use of the image forming apparatus 101 can occur after the user selects a use environment and performs the collective setting of the security functions. With the setting cancel button 502, the state before the collective setting can be restored to immediately address the issue in such a case.

Next, processing from the selection of a use environment by the user on the setting screen 500 to the collective setting of the security functions will be described with reference to FIG. 6.

Figure 6:
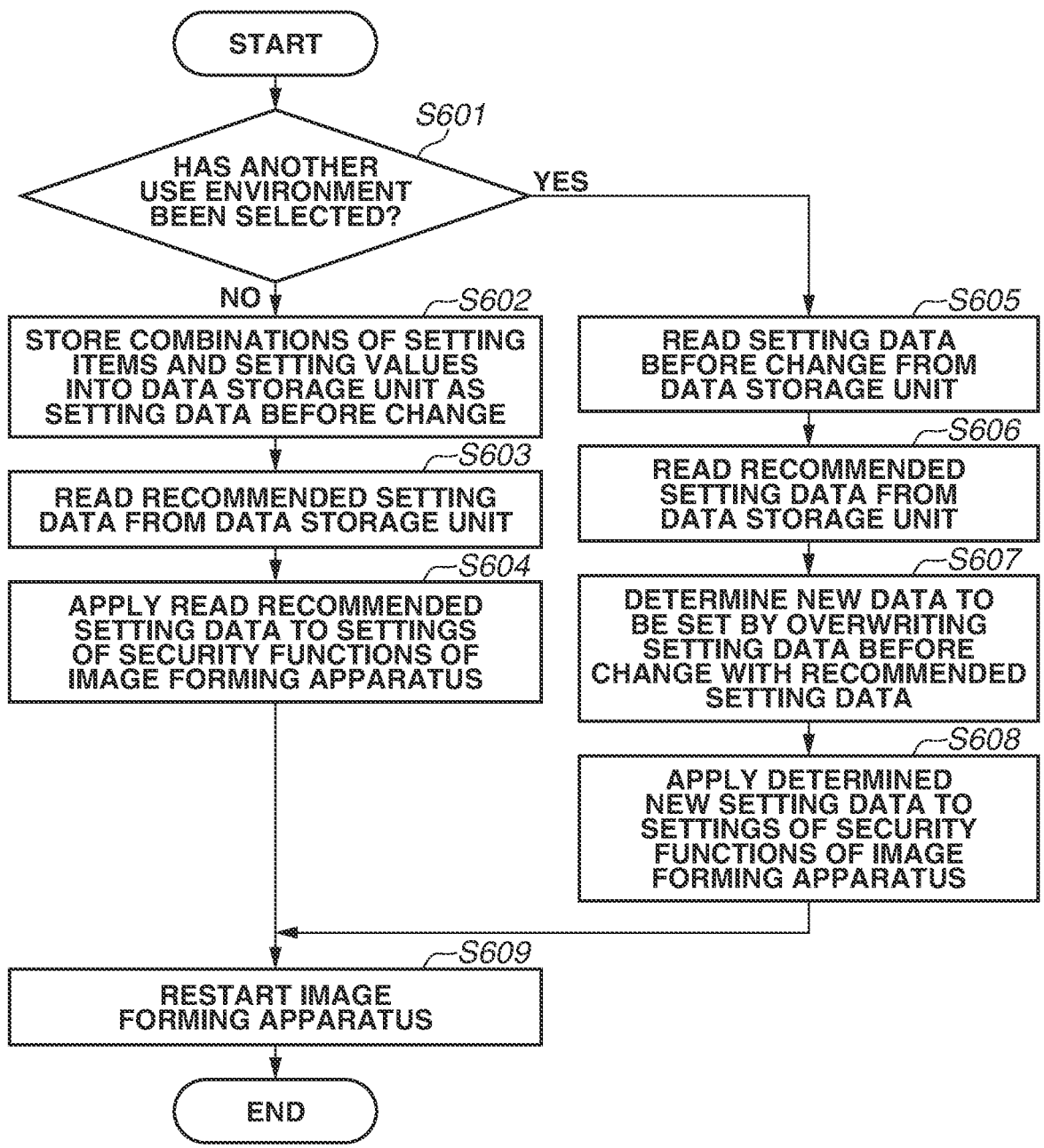
FIG. 6 is a flowchart illustrating an example of security setting processing performed by the image forming apparatus.

The operations (steps) illustrated in the flowchart of FIG. 6 are implemented by the CPU 311 calling the programs for implementing the respective control units stored in the ROM 312 or the HDD 314 into the RAM 313 and executing the programs.

The processing illustrated in FIG. 6 is started if the operation control unit 410 detects that the user selects a use environment and presses the execution button 503 on the operation unit 320.

In step S601, the security setting control unit 430 determines whether another use environment has already been selected and the collective setting of the security functions suitable for the use environment has been applied. The security setting control unit 430 makes the determination using the setting data before change 422 stored in the data storage unit 420. If the setting data before change 422 is stored in the data storage unit 420, the security setting control unit 430 determines that another use environment has already been selected. If the setting data before change 422 is not stored in the data storage unit 420, the security setting control unit 430 determines that another use environment has not been selected. If the setting data before change 422 is stored (YES in step S601), the processing therefore proceeds to step S605. If the setting data before change 422 is not stored (NO in step S601), the processing proceeds to step S602.

Processing in the case where the setting data before change 422 is not stored will initially be described. In step S602, the security setting control unit 430 stores the combinations of the setting items and the setting values of the security functions currently applied into the data storage unit 420 as the setting data before change 422.

In step S603, the security setting control unit 430 reads recommended setting data from the data storage unit 420. The recommended setting data refers to combinations of security setting items and setting values suitable for the use environment selected by the user. The operation control unit 410 detects the use environment selected by the user on the operation unit 320, and the security setting control unit 430 receives the information from the operation control unit 410. The security setting control unit 430 performs the processing of step S603 by extracting the recommended setting data suitable for the selected use environment from the recommended setting value database 421 stored in the data storage unit 420.

In step S604, the security setting control unit 430 applies the read recommended setting data to the settings of the security functions of the image forming apparatus 101. Specifically, the security setting control unit 430 reads the current operation setting data 423 stored in the data storage unit 420 and overwrites the current operation setting data 423 with the recommended setting data. In other words, if the recommended setting data on the setting item of a security function has a value (recommended setting value), the setting value is changed to the recommended setting value. If the recommended setting data on the setting item of a security function does not have a value (item represented by a diagonal line in Table 2), the setting value is left unchanged from that in the current operation setting data 423. By performing such processing, the security setting control unit 430 determines combinations of the setting items and setting values of the security functions to be newly set. The security setting control unit 430 rewrites the current operation setting data 423 with the newly determined data.

In step S609, the security setting control unit 430 restarts the image forming apparatus 101. When the image forming apparatus 101 is restarted, the rewritten current operation setting data 423 is read by the programs, and the programs run with the rewritten new settings. In such a manner, the applied settings are reflected on the operation of the image forming apparatus 101.

Next, processing in the case where the setting data before change 422 is determined to be stored in the data storage unit 420 in step S601 will be described. In step S605, the security setting control unit 430 reads the setting data before change 422 stored in the data storage unit 420.

In step S606, the security setting control unit 430 reads the recommended setting data suitable for the use environment selected by the user. The processing of step S606 is similar to that of step S603.

In step S607, the security setting control unit 430 determines combinations of the setting items and setting values of the security functions to be newly set using the setting data before change 422 read in step S605 and the recommended setting data read in step S606. The security setting control unit 430 determines the data to be newly set by overwriting the setting data before change 422 with the recommended setting data. If the recommended setting data on the setting item of a security function has a value (recommended setting value), the setting value is changed to the recommended setting value. If the recommended setting data on the setting item of a security function does not have a value (item represented by a diagonal line in Table 2), the setting value is left unchanged from that in the setting data before change 422. By performing such processing, the security setting control unit 430 determines combinations of the setting items and setting values of the security functions to be newly set.

In step S608, the security setting control unit 430 applies the setting values determined in step S607 to the settings of the security functions of the image forming apparatus 101. Specifically, the security setting control unit 430 rewrites the current operation setting data 423 with the new data determined in step S607.

In step S609, the security setting control unit 430 restarts the image forming apparatus 101, whereby the applied settings are reflected on the operation of the image forming apparatus 101.

By the foregoing processing, if the user selects a use environment of the image forming apparatus 101, processing for collectively configuring the settings of the security functions to ones suitable for the use environment can be implemented.

The overwrite processing of step S607 may be omitted. In such a case, only the processing of steps S603 and S604 is performed instead of the processing of steps S605 to S608.

Next, setting cancellation processing using the setting cancel button 502 will be described with reference to FIG. 7. Like FIG. 6, the operations (steps) illustrated in the flowchart of FIG. 7 are implemented by the CPU 311 reading the programs for implementing the respective control units stored in the ROM 312 or the HDD 314 into the RAM 313 and executing the programs.

The processing illustrated in FIG. 7 is started if the operation control unit 410 detects that the user selects the setting cancel button 502 and presses the execution button 503 on the operation unit 320.

In step S701, the security setting control unit 430 reads the setting data before change 422 stored in the data storage unit 420.

In step S702, the security setting control unit 430 applies the read setting data before change 422 to the settings of the security functions of the image forming apparatus 101.

In step S703, the security setting control unit 430 deletes the setting data before change 422 stored in the data storage unit 420.

In step S704, the security setting control unit 430 restarts the image forming apparatus 101, whereby the applied settings are reflected on the operation of the image forming apparatus 101.

By performing such processing, if the user chooses to cancel the collective setting, setting cancellation processing for restoring the state before the collective setting of the security functions suitable for the use environment can be implemented.

The series of processing described above can have the user select a use environment of the information processing apparatus and collectively configure the settings of the security-related functions to ones suitable for the selected use environment. Even if an issue of a user-desired function being unable to be used due to the setting change occurs, the state before the setting change can be immediately restored. This can improve the convenience of the settings of the security functions.

Figure 5:
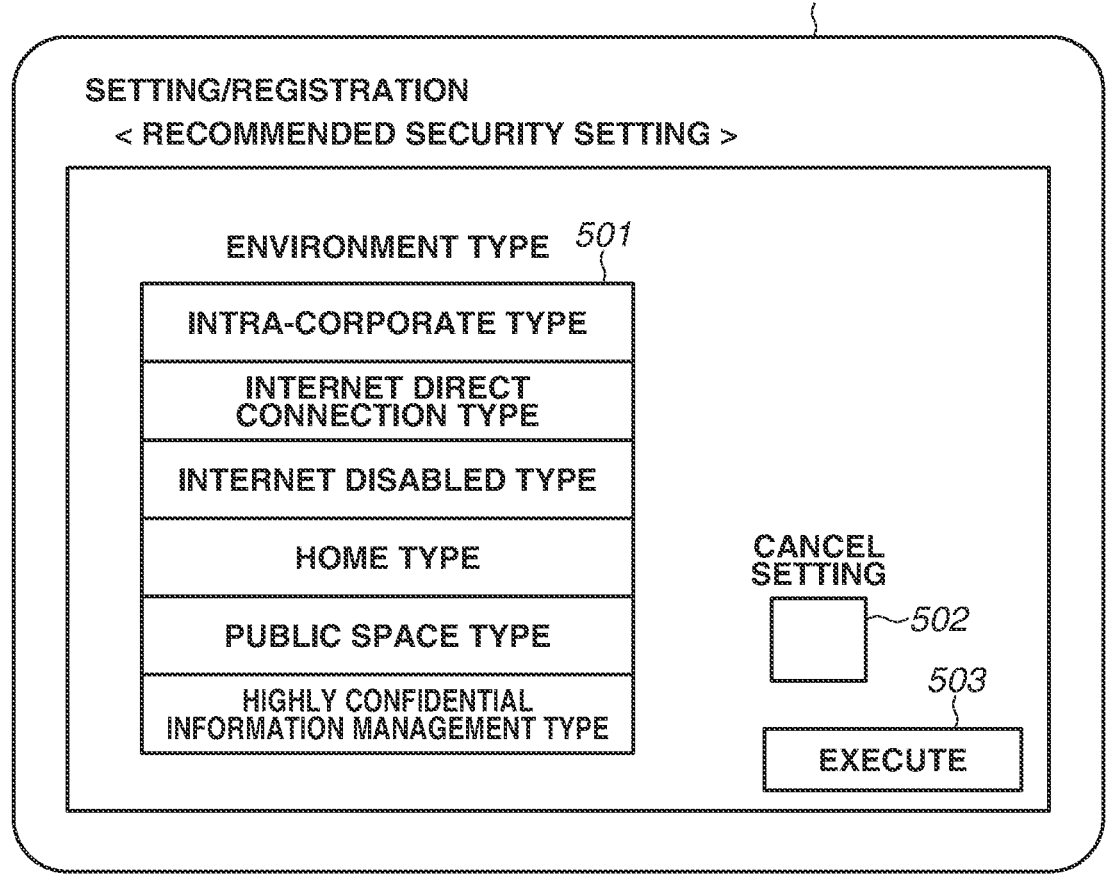
FIG. 5 is a diagram illustrating an example of a screen displayed on an operation unit of an image forming apparatus in a first embodiment.

In the first embodiment, the environment types are described to be selected by the user as illustrated by the use environment list buttons 501 in FIG. 5. In a second embodiment, a configuration where questions for determining the use environment are displayed to the user and the settings of the security functions are collectively configured based on the use environment determined based on the user's answers to the questions will be described. An image forming apparatus 101 according to the present embodiment has a similar hardware configuration and software configuration to those in the first embodiment. A description thereof will thus be omitted.

A screen configuration according to the present embodiment will be described with reference to FIGS. 8A to 8C. FIGS. 8A to 8C illustrate examples of setting screens displayed on the operation unit 320 of the image forming apparatus 101. While the setting screens displayed on the operation unit 320 of the image forming apparatus 101 are described in the present embodiment, this is not restrictive. For example, using the web UI control unit 440, web pages similar to setting screens 800 to 802 to be described below may be provided to a web browser on an external information processing apparatus so that setting operations are made via the web pages.

Due to limitations of this specification's space, FIGS. 8A to 8C illustrate examples of screens that can be displayed on the operation unit 320. FIG. 8A illustrates a setting screen 800 for providing the user with a question to distinguish the Internet disabled type from the corporate intranet type and the Internet direct connection type.

FIG. 8B illustrates a setting screen 801 that is displayed if the user selects "YES" on the setting screen 800. The setting screen 801 provides the user with a question to distinguish the corporate intranet type from the Internet direct connection type. FIG. 8C illustrates a setting screen 802 that is displayed if the user selects "NO" on the setting screen 801. The setting screen 802 says that as the result of the use environment determination, the use environment is determined to be the Internet direct connection type. The setting screen 802 further provides the user with a question asking whether to apply the settings of the security functions suitable for the Internet direct connection type. If the user selects "YES" on the setting screen 802, the settings of the security functions suitable for the Internet direct connection type are applied.

Processing related to the screen display illustrated in FIGS. 8A to 8C and the collective setting of the security functions will be described with reference to FIGS. 9 and 10.

The operations (steps) illustrated in FIGS. 9 and 10 are implemented by the CPU 311 calling the programs for implementing the respective control units stored in the ROM 312 or the HDD 314 into the RAM 313 and executing the programs.

The processing illustrated in FIG. 9 is started if the operation control unit 410 detects that the user opens a security function setting screen on the operation unit 320.

The processing illustrated in FIGS. 9 and 10 determines which of the definitions illustrated in FIG. 2 the use environment used by the user applies to by asking the user a plurality of questions. The following description will be thus described in conjunction with the environment classification steps in FIG. 2.

In step S901, the operation control unit 410 displays a question asking the user whether the use environment of the image forming apparatus 101 is where highly confidential information is handled, on the operation unit 320. The question of step S901 corresponds to the classification of step S201 in FIG. 2. With the question displayed, the processing proceeds to step S902. In step S902, if the operation control unit 410 detects that the user's answer to the question of step S901 is "YES" (YES in step S902), the processing proceeds to processing A to be described below. If the operation control unit 410 detects that the answer is "NO" (NO in step S902), the processing proceeds to step S903.

In step S903, the operation control unit 410 displays a question asking the user whether the use environment of the image forming apparatus 101 is an entry-controlled environment, on the operation unit 320. The question of step S903 corresponds to the classification of step S202 in FIG. 2. With the question displayed, the processing proceeds to step S904.

In step S904, if the operation control unit 410 detects that the user's answer to the question of step S903 is "NO" (NO in step S904), the processing proceeds to step S905. If the operation control unit 410 detects that the answer is "YES" (YES in step S904), the processing proceeds to step S907.

In step S905, the operation control unit 410 displays a question asking the user whether the use environment of the image forming apparatus 101 is where unspecified users share the network, on the operation unit 320. The question of step S905 corresponds to the classification of step S205 in FIG. 2.

With the question displayed, the processing proceeds to step S906. In step S906, if the operation control unit 410 detects that the user's answer to the question of step S905 is "YES" (YES in step S906), the processing proceeds to processing B to be described below. If the operation control unit 410 detects that the answer is "NO" (NO in step S906), the processing proceeds to processing C to be described below.

In step S907, the operation control unit 410 displays a question asking the user whether the use environment of the image forming apparatus 101 is an Internet-connected environment, on the operation unit 320. The question of step S907 corresponds to the classification of step S203 in FIG. 2. With the question displayed, the processing proceeds to step S908. In step S908, if the operation control unit 410 detects that the user's answer to the question of step S907 is "NO" (NO in step S908), the processing proceeds to processing D to be described below. If the operation control unit 410 detects that the user' answer is "YES" (YES in step S908), the processing proceeds to step S909.

In step S909, the operation control unit 410 displays a question asking the user whether the use environment of the image forming apparatus 101 is firewalled, on the operation unit 320. The question of step S909 corresponds to the classification of step S204 in FIG. 2. With the question displayed, the processing proceeds to step S910. In step S910, if the operation control unit 410 detects that the user's answer to the question of step S909 is "NO" (NO in step S910), the processing proceeds to processing E to be described below. If the operation control unit 410 detects that the answer is "YES" (YES in step S910), the processing proceeds to step S911.

In step S911, the operation control unit 410 displays a question asking the user whether to apply the recommended settings suitable for a corporate intranet environment to the settings of the security functions of the image forming apparatus 101, on the operation unit 320. With the question displayed, the processing proceeds to step S912. In step S912, if the operation control unit 410 detects that the user's answer to the question of step S911 is "YES" (YES in step S912), the processing proceeds to step S913. If the operation control unit 410 detects that the answer is "CANCEL" (NO in step S912), the processing proceeds to processing F and returns to step S901. Instead of returning to step S901, the setting screen 500 of FIG. 5 may be displayed here. Alternatively, a message or a Quick Response® code for guiding the user to display a detailed instruction manual may be displayed.

In step S913, the security setting control unit 430 applies the recommended settings suitable for a corporate intranet environment to the settings of the security functions of the image forming apparatus 101. The recommended settings are applied by similar processing to that in the first embodiment described with reference to FIG. 6. In step S914, the security setting control unit 430 restarts the image forming apparatus 101, whereby the applied settings are reflected on the operation of the image forming apparatus 101.

Next, the aforementioned processing A to E will be described with reference to FIGS. 10A to 10E.

Figure 10A:
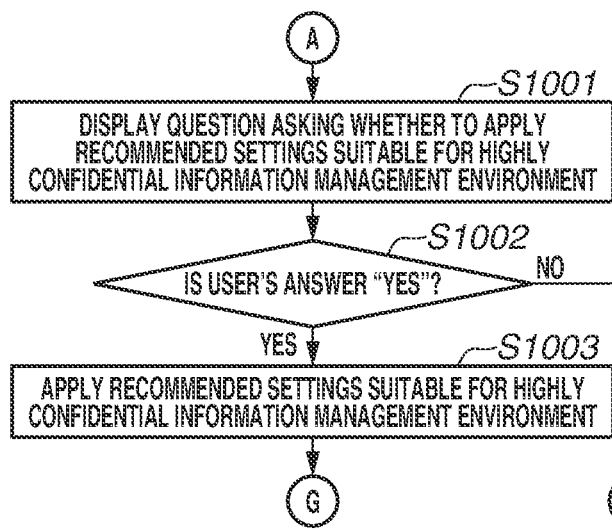
FIGS. 10A to 10E each illustrate a flowchart of an example of screen display and security setting processing performed by the image forming apparatus in the second embodiment.
Figure 10B:
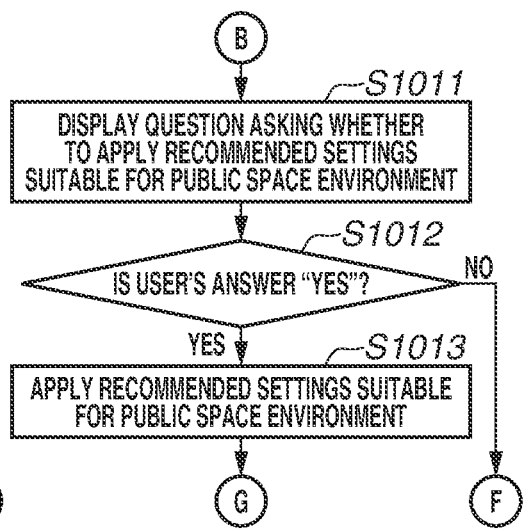
Figure 10C:
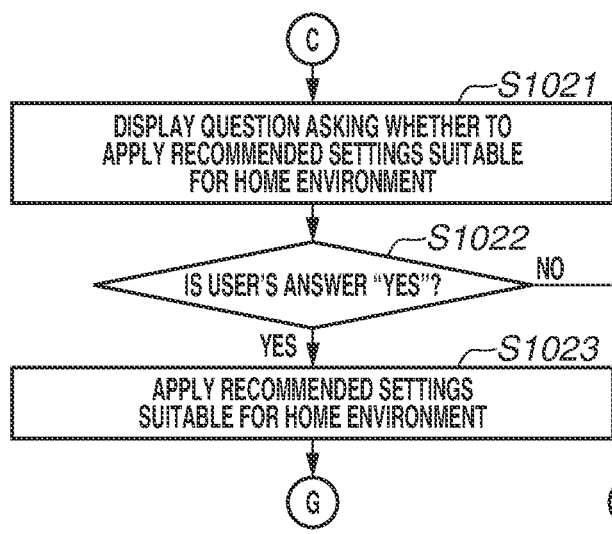
Figure 10D:
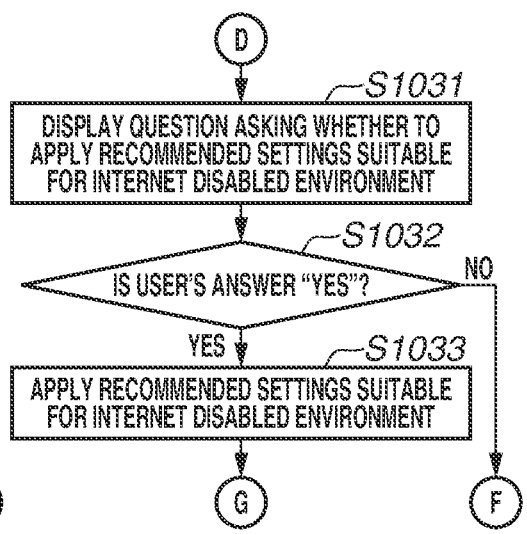
Figure 10E:
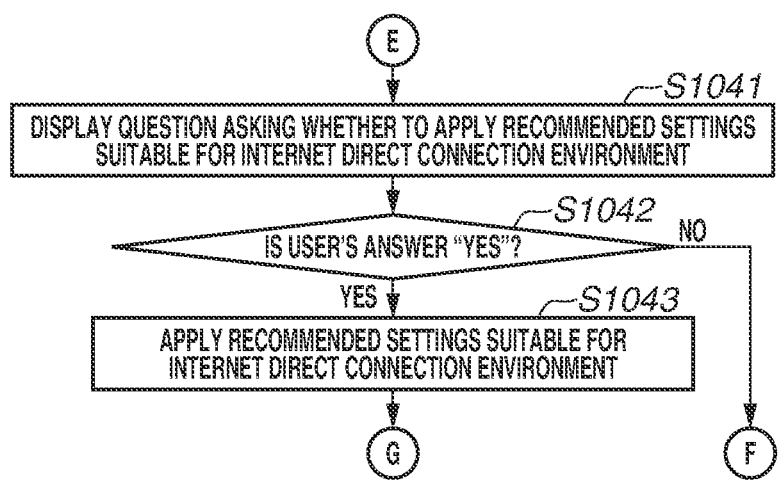

Processing A will initially be described with reference to FIG. 10A. In step S1001, the operation control unit 410 displays a question asking the user whether to apply the recommended settings suitable for a highly confidential information management environment to the settings of the security functions of the image forming apparatus 101, on the operation unit 320. With the question displayed, the processing proceeds to step S1002. In step S1002, if the operation control unit 410 detects that the user's answer to the question of step S1001 is "YES" (YES in step S1002), the processing proceeds to step S1003. If the operation control unit 410 detects that the answer is "CANCEL" (NO in step S1002), the processing proceeds to processing F and returns to step S901. In step S1003, the security setting control unit 430 performs similar processing to that of FIG. 6 to apply the recommended settings suited for a highly confidential information management environment to the settings of the security functions of the image forming apparatus 101. The processing proceeds to processing G. In step S914, the security setting control unit 430 restarts the image forming apparatus 101.

Processing B to E is similar to processing A. While processing A performs display and setting related to a highly confidential information management environment, processing B deals with a public space environment, processing C a home environment, processing D an Internet disabled environment, and processing E an Internet direct connection environment instead.

In such a manner, processing for having by the user answer questions to determine the use environment and collectively configuring the settings of the security functions to ones suitable for the use environment of the image forming apparatus 101 can be implemented.

In the foregoing embodiments, the display of the setting screen(s) and the generation of the current operation setting data 423 are described to be performed on the image forming apparatus 101 or the web pages provided to the web browser on the external information processing apparatus using the web UI control unit 440 of the image forming apparatus 101.

However, this is not restrictive. Specifically, the display of the setting screen(s) and the generation of the current operation setting data 423 may be performed on an application on the external information processing apparatus.

Such an external application includes an operation control unit for displaying the setting screen(s) illustrated in FIG. 5 or 8A to 8C and accepting user operations. The external application also includes a data storage unit storing data similar to the recommended setting value database 421, the setting data before change 422, and the current operation setting data 423. The external application obtains the data similar to the current operation setting data 423 from the image forming apparatus 101 via a network.

The external application initially displays the setting screen(s) illustrated in FIG. 5 or 8A to 8C on the external information processing apparatus. The user selects the use environment of the image forming apparatus 101 on the external application. The external application accepts information indicating the use environment selected by the user.

The external application extracts the recommended setting data suitable for the use environment selected by the user from the data similar to the recommended setting value database 421 stored in the data storage unit. The external application performs processing similar to that of steps S601 to S608 of FIG. 6 inside to generate new current operation setting data.

The external application transmits an operation setting change instruction to the image forming apparatus 101 based on the generated new current operation setting data. For example, the external application transmits the operation setting change instruction using an SNMP SetRequest operation. The communication protocol used for the setting change and the method for issuing the instruction for the setting change are not limited to SNMP.

For example, the external application may be configured to generate a data file for exporting data listing the setting items and the setting values, and transmit the data file to the image forming apparatus 101. Receiving the data file, the image forming apparatus 101 changes its own settings based on the data file.

The image forming apparatus 101 receives the new current operation setting data from the external application, and applies the new current operation setting data to the settings of the image forming apparatus 101. The image forming apparatus 101 restarts itself, whereby the applied settings are reflected on the operation of the image forming apparatus 101.

By performing the foregoing processing, the user can configure the settings of the security functions of the image forming apparatus 101 on the application on the external information processing apparatus.

In the present modification, the external application obtains the current operation setting data 423 from the image forming apparatus 101 via a network. Here, the external application may name the obtained current operation setting data 423 and store the named current operation setting data 423 into the data storage unit. The current operation setting data 423 may be named based on the use environment selected by the user. As described above, after the collective setting is performed based on the use environment selected by the user, the user can change the setting values of the respective setting items to different setting values again. If the setting values of the current operation setting data 423 obtained by the external application are thus changed, the current operation setting data 423 may be stored under a new name. The setting data thus stored can be distributed to image forming apparatuses other than the image forming apparatus 101. The distributed setting data are applied to the image forming apparatuses.

An embodiment of the present invention can be implemented by processing for supplying a program for implementing one or more functions of the foregoing embodiments to a system or an apparatus via a network or a storage medium, and reading and executing the program by one or more processors in a computer of the system or apparatus. A circuit for implementing one or more functions (such as an application specific integrated circuit [ASIC] and a field programmable gate array [FPGA]) can also be used for implementation.

According to an aspect of the present invention, a printing apparatus that has the user select a use environment of the printing apparatus and configures the settings of security-related functions to ones suitable for the selected use environment can be provided. According to another aspect of the present invention, convenience of the settings of the security-related functions can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Applications No. 2021-199141, filed Dec. 8, 2021, and No. 2022-081499, filed May 18, 2022, which are hereby incorporated by reference herein in their entirety.

What is claimed is:
1. A printing apparatus comprising:
 a storage unit configured to store
  a first setting value group including a first plurality of setting values corresponding to a first plurality of setting items in association with a first use environment, and
  a second setting value group including a second plurality of setting values corresponding to a second plurality of setting items in association with a second use environment;
 a reception unit configured to receive information indicating a selection result specifying a use environment of the printing apparatus;
 a specifying unit configured to specify, as the use environment of the printing apparatus, the first use envi- ronment or the second use environment based on the information indicating the selection result; and a setting change unit configured to change a setting value of the printing apparatus based on the first setting value group or the second setting value group stored in association with the specified use environment in the storage unit, wherein the first plurality of setting items includes a security setting item relating to printing, wherein the first plurality of setting values is at least in part different from the second plurality of setting values, and wherein in a case where the specified use environment is changed from the first use environment to the second use environment, the setting change unit is further configured to:

based on the second setting value group, confirm a value, set before the first use environment is specified, for a setting item included in the first plurality of setting items, and set the confirmed value for the setting item.

2. The printing apparatus according to claim 1, wherein the reception unit is configured to further receive information indicating an instruction to cancel a change made to the setting value by the setting change unit.

3. The printing apparatus according to claim 2, wherein the storage unit is configured to further store a third setting value group to cancel the change made to the setting value by the setting change unit, and wherein the third setting value group is a setting value group set in the printing apparatus before the setting value is changed by the setting change unit.

4. The printing apparatus according to claim 3, wherein the setting change unit is configured to, if the information indicating the instruction to cancel the change is received by the reception unit, set the setting value of the printing apparatus based on the third setting value group.

5. The printing apparatus according to claim 3, wherein the setting change unit is configured to determine, for the use environment of the printing apparatus, the setting value of the printing apparatus by overwriting the third setting value group with the first setting value group or the second setting value group.

6. The printing apparatus according to claim 1, wherein the reception unit is configured to further receive information indicating a user's instruction to change a setting value corresponding to an individual setting item of the printing apparatus after the setting value of the printing apparatus is changed based on the first setting value group or the second setting value group.

7. The printing apparatus according to claim 6, wherein the setting change unit is configured to change the setting value of the printing apparatus to a setting value specified by the information indicating the instruction to change the setting value corresponding to the individual setting item.

8. The printing apparatus according to claim 1, wherein the information indicating the selection result is received by a user selecting one from options for use environments divided into a plurality of categories.

9. The printing apparatus according to claim 8, wherein the options for the use environments include at least more than one of six options that are a corporate intranet environment, an Internet direct connection environment, an Internet disabled environment, a home environment, a public space environment, and a highly confidential information management environment.

10. The printing apparatus according to claim 8, wherein the options for the use environments include at least a home environment indicating an environment where the printing apparatus is assumed to be used for working from home.

11. The printing apparatus according to claim 1, wherein the information indicating the selection result is received by a user selecting an answer to a question to determine the use environment.

12. The printing apparatus according to claim 1, wherein the reception unit is configured to receive information indicating a result of a selection made by a user via a screen of the printing apparatus.

13. The printing apparatus according to claim 1, further comprising a communication unit configured to perform network communication with an external information processing apparatus, wherein the reception unit is configured to receive information indicating a result of a selection made by a user on the external information processing apparatus.

14. The printing apparatus according to claim 13, wherein the first setting value group or the second setting value group is a setting value group generated by the external information processing apparatus and transmitted to the printing apparatus.

15. The printing apparatus according to claim 1, wherein the security setting item relating to printing includes at least either a setting item relating to display of a print job history or a setting item relating to automatic deletion of an interrupted print job.

16. The printing apparatus according to claim 1, wherein the security setting item relating to printing is a security setting item specific to the printing apparatus.

17. The printing apparatus according to claim 1, wherein the security setting item relating to printing is a security setting item relating to a device management protocol to be used by an administrator of the printing apparatus.

18. The printing apparatus according to claim 1, wherein the security setting item relating to printing is a security setting item relating to a password used on the printing apparatus.

19. A printing apparatus comprising:

a reception unit configured to receive information indicating an environment where the printing apparatus is assumed to be used for working from home as a selection result specifying a use environment of the printing apparatus; and a setting change unit configured to change a setting value of the printing apparatus based on a setting value group including a plurality of setting values corresponding to a plurality of setting items including a security setting item of the printing apparatus associated with the information indicating the environment where the printing apparatus is assumed to be used for working from home as the selection result, wherein the security setting item of the printing apparatus includes a setting item related to a device management protocol to be used by an administrator and a setting item related to a password used on the printing apparatus.

20. A control method of a printing apparatus including a storage unit, the storage unit being configured to store a first setting value group including a first plurality of setting values corresponding to a first plurality of setting items in association with a first use environment, and a second setting value group including a second plurality of setting values corresponding to a second plurality of setting items in association with a second use environment, the control method comprising:

receiving information indicating a selection result specifying a use environment of the printing apparatus;

specifying, as the use environment of the printing apparatus, the first use environment or the second use environment based on the information indicating the selection result; and changing a setting value of the printing apparatus based on the first setting value group or the second setting value group stored in association with the specified use environment in the storage unit, wherein the first plurality of setting items includes a security setting item relating to printing, wherein the first plurality of setting values is at least in part different from the second plurality of setting values, and wherein in a case where the specified use environment is changed from the first use environment to the second use environment, the setting change unit is further configured to:

based on the second setting value group, confirm a value, set before the first use environment is specified, for a setting item included in the first plurality of setting items, and set the confirmed value for the setting item.

21. A non-transitory storage medium storing a computer program for performing a control method of a printing apparatus including a storage unit, the storage unit being configured to store a first setting value group including a first plurality of setting values corresponding to a first plurality of setting items in association with a first use environment, and a second setting value group including a second plurality of setting values corresponding to a second plurality of setting items in association with a second use environment, the control method comprising:

receiving information indicating a selection result specifying a use environment of the printing apparatus;

specifying, as the use environment of the printing apparatus, the first use environment or the second use environment based on the information indicating the selection result; and changing a setting value of the printing apparatus based on the first setting value group or the second setting value group stored in association with the specified use environment in the storage unit, wherein the first plurality of setting items includes a security setting item relating to printing, wherein the first plurality of setting values is at least in part different from the second plurality of setting values, and wherein in a case where the specified use environment is changed from the first use environment to the second use environment, the setting change unit is further configured to:

based on the second setting value group, confirm a value, set before the first use environment is specified, for a setting item included in the first plurality of setting items, and set the confirmed value for the setting item.

\* \* \* \* \*